UNITED STATES PATENT OFFICE.

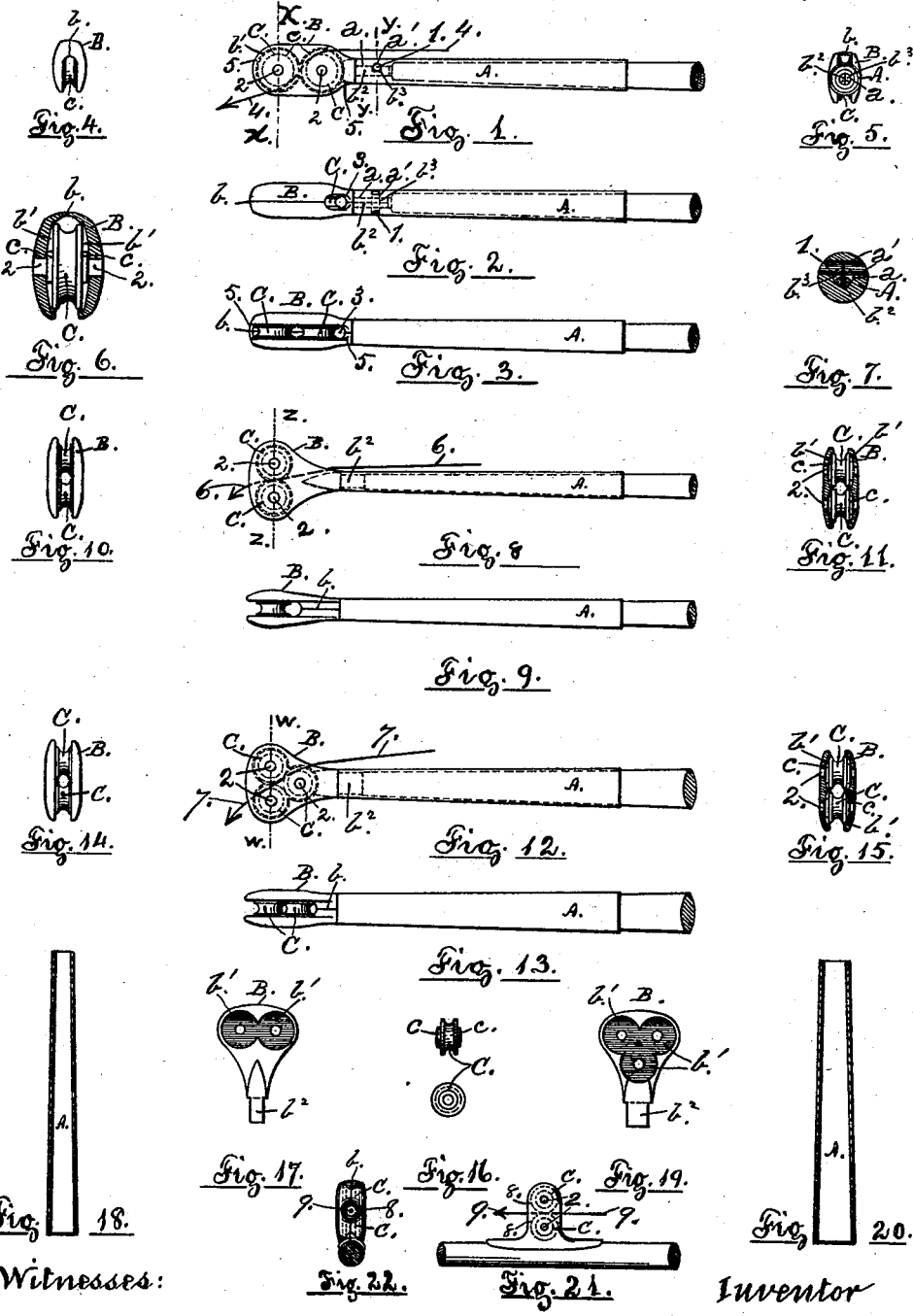

SAMUEL T. DAVIS, OF LANCASTER, PENNSYLVANIA.

LINE-GUIDE FOR FISHING-RODS.

SPECIFICATION forming part of Letters Patent No. 521,704, dated June 19, 1894.

Application filed September 23, 1891. Serial No. 406,558. (No model.)

*To all whom it may concern:*

Be it known that I, SAMUEL T. DAVIS, of Lancaster, in the county of Lancaster and State of Pennsylvania, have invented certain new and useful Improvements in Antifriction Pole-Tips and Guides for Fishing-Rods; and I do hereby declare the following to be a full, clear, and exact description of the invention, such as will enable others skilled in the art to which it appertains to make and use the same.

This invention relates particularly to improvements in pole-tips of that class which are attached to the forward ends of fishing rods to keep the line in place at this point as said line is paid out or drawn in when a fish is hooked.

The object of the invention is to reduce the friction on the line at the forward end of a fishing rod, as well as along its body, to the minimum to prevent the chafing or abrading so well known in connection with the tips and guides now in common use.

The invention consists, first, in the arrangement of grooved pulleys in the forward end of a fishing pole tip; second, in the mounting or pivoting of said pulleys in a jaw or pulley holder secured to the forward end of the usual ferrule or sleeve; and third, in providing means whereby said jaw may swivel or turn axially in place on said ferrule; and also, in applying similar pulleys to the guide lugs or bases secured at intervals to the body of the rod.

The purposes of the invention are attained by the mechanism and devices illustrated in the accompanying drawings in which similar letters and figures of reference designate like parts throughout the several views, and in which—

Figures 1, 2 and 3 are respectively side, top and bottom views of a fishing pole tip embodying the elements of this invention, a portion of the pole shown in place; Fig. 4, an elevation of the left end of Fig. 1; Fig. 5, an elevation of the right end of Fig. 1, the portion of the pole removed; Fig. 6, an enlarged sectional elevation of the portion to the right of the line $x\ x$ in Fig. 1; Fig. 7, a similar elevation of the portion to the right of the line $y\ y$ in Fig. 1; Fig. 8, a side view of a tip having a perpendicular arrangement of the pulleys; Fig. 9 a top, or a bottom, view of Fig. 8; Fig. 10, an elevation of the left end of Fig. 8; Fig. 11, a sectional elevation of the portion to the right of the line $z\ z$ in Fig. 8; Fig. 12, a side view of a tip having a triangular arrangement of three pulleys; Fig. 13, a top, or a bottom, view of Fig. 12; Fig. 14, an elevation of the left end of Fig. 12; Fig. 15, a sectional elevation of the portion to the right of the line $w\ w$ in Fig. 12; Fig. 16, a plan and elevation of the pulley used in the several constructions; Fig. 17, an inner face view of one side, or one half, of the jaw detached from Fig. 8; Fig. 18, a longitudinal section of the ferrule detached from Fig. 8; Fig. 19, an inner face view of one side, being one half, of the jaw detached from Fig. 12; Fig. 20 a longitudinal section of the ferrule detached from Fig. 12; Fig. 21, a view of a portion of a fishing rod with a side elevation of a guide having two grooved pulleys in place on said rod; and Fig. 22, an elevation of the left end of Fig. 21.

Figs. 1 to 7, both inclusive, illustrate the first construction of my invention, consisting of a ferrule A, a jaw B, and two grooved pulleys C and C.

The ferrule A has the usual socket for attaching to the forward end of a fishing rod, and it has a thickened forward end having therein an axial bore $a$, and therethrough, a transverse orifice $a'$ perpendicular to and a little above its axis.

The jaw B consists of two parts or arms similar in form but made right and left so as to have their inner faces come together along the line $b$ and soldered, brazed, or otherwise secured to form one body. These parts are pressed out of metal or they may otherwise be given the required shape; they have in their inner faces or walls recesses $b'$ adapted to receive the hubs and partially the sides of the pulleys, and their outer edges are nicely rounded to prevent abrasion to the line should it come in contact therewith; and, they have extending axially from their rear ends semi-cylindrical projections which when brought together and fastened form the shaft $b^2$ adapted to closely fit into the axial bore $a$ of the ferrule before mentioned; and the shaft $b^2$ has across its upper side a transverse cut or notch $b^3$ to register, or move in line, with the transverse orifice $a'$ of the ferrule; while, a pin 1 passed through said orifice $a'$ and engaging said notch $b^3$ serves to connect the jaw B to the ferrule A and completes the swivel joint.

The pulleys C and C have grooved peripheries, axial bores through their centers, and hubs $c$ one on each side about said bores; the pulleys are adapted to fit into the recesses $b'$ before mentioned; the hub ends against their sides, and pins 2 passed through the central bores and riveted outside against the sides, serve to pivot said pulleys in place within the jaw and complete the first construction of the invention.

Now the several parts having been placed in the positions shown in the drawings, an inspection of Fig. 2 shows an oblong orifice 3 into which the line is passed as indicated by the arrow 4 in Fig. 1, and following the course of said arrow, shown by dotted line between the pulleys, coming out below, as indicated by the arrow point. From 5 to 5 in Fig. 1, on the under side of the jaw the pulleys are uncovered as shown in Fig. 3, so that the line may touch the pulleys freely, either forward or backward, without coming in contact with the sides of the jaw.

An inspection of Fig. 7 shows that the swivel joint will not allow the jaw to turn completely around, but simply to reciprocate backward and forward over about one half of a revolution, keeping the line from being twisted about the tip and preventing tangling at this point.

When it is desired, two parts shown in Fig. 17 may be placed together to form a jaw; pivoting between its arms two pulleys shown in Fig. 16, and securing its shaft into the forward end of a ferrule shown in Fig. 18, a tip shown in Figs. 8 to 11 both inclusive may be constructed, and the line may be passed therethrough as is indicated by the arrow 6 in Fig. 8.

When it is desired, two parts shown in Fig. 19 may be placed together to form a jaw; pivoting between its arms three pulleys shown in Fig. 16, and securing its shaft into the forward end of a ferrule shown in Fig. 20, a tip shown in Figs. 12 to 15 both inclusive may be constructed, and the line may be passed therethrough as is indicated by the arrow 7 in Fig. 12.

In Figs. 8 and 12 as indicated by the arrows 6 and 7 the line is shown as entering the tip on the upper side, it will be seen that the line may with equal facility be passed thereinto through the under side, coming out between the two vertical pulleys the same as before. In both of these constructions the jaws are fixed, in the forward ends of their respective ferrules, but they may readily be made to swivel, for they may easily be given the construction of the joint indicated in Fig. 7.

It is well known that swivel joints may be constructed in divers ways, I do not wish to confine myself solely to the construction herein given.

When the tip is to be used in connection with a rod having a very small forward end, the one shown in Figs. 8 to 11 may be desirable; but, when such rod has a very thick forward end, the construction shown in Figs. 12 to 15 will be preferable, for the third pulley will serve to keep the line from rubbing against the metal at the heel of the jaw, see Fig. 12.

In Figs. 21 and 22 is shown an arrangement of two pulleys pivoted one above the other between the arms of a jaw projecting upward from a guide plate or base secured to the rod in the usual manner. In Fig. 22 is shown an orifice 8 formed by the grooves in their peripheries between the two pulleys pivoted the same as shown in Figs. 10 and 11, and the dot at the center of the orifice indicates the position of the line when passed therethrough as shown by the course of the arrow 9 in Fig. 21; and, the line being carried by the pulleys does not come in contact with the metal of the jaw and is thus protected from chafing or abrasion. Of course any number of guides may be used.

Referring to Fig. 8 it may be seen that by removing the portion above the line indicated by the course of arrow 6 a jaw having one pulley will be constructed, but when using this the line should be carried along the under side of the rod; when also, guides having one pulley may be used. These constructions being so apparent their separate illustration was deemed superfluous.

Having now described my invention, what I do consider new, and desire to secure by Letters Patent of the United States, is—

1. A pole tip provided with a jaw having two parts or arms, each of said arms provided at its upper end with circular recesses, and at the lower end with a semicircular shank, the pulleys mounted in the recesses in the arms of said jaw, and the ferrule adapted to receive the shank of the jaw, substantially as described.

2. A pole tip to be attached to the forward end of a fishing rod comprising in combination, a jaw made in two parts or arms, each of said arms provided on its inner face with circular recesses, a pulley or pulleys having hubs which are journaled in said recesses, the semicylindrical projections which when brought together form the shank of the jaw, the ferrule in which said shank is mounted and swiveled, substantially as described.

In testimony whereof I have hereunto subscribed my name in the presence of two subscribing witnesses.

SAML. T. DAVIS.

Witnesses:
HARRY O. CONN,
EDW. R. HEITSHU.